INVENTORS
DAVID FRANK DAVIES
THOMAS DICKINSON
ARTHUR DAVID FOORD

United States Patent Office 3,689,394
Patented Sept. 5, 1972

3,689,394
OXYGEN SENSORS
David Frank Davies, 66 Mirlaw Road, Whitelea Chase, Cramlington, Northumberland, England; Thomas Dickinson, 10 Eastcliffe Ave., Kenton Park, Newcastle-upon-Tyne 3, Northumberland, England; and Arthur David Foord, 270 Yarm Road, Darlington, County Durham, England
Filed Aug. 11, 1970, Ser. No. 62,988
Claims priority, application Great Britain, Aug. 11, 1969, 40,078/69
Int. Cl. G01n 27/46
U.S. Cl. 204—195 P                                                19 Claims

ABSTRACT OF THE DISCLOSURE

This specification describes oxygen sensors which include an electrochemical cell having a gas diffusion electrode as cathode, a salt electrolyte capable of being molten at the temperature of operation of the sensor and a counter electrode as anode; the gas diffusion electrode includes a porous metal layer and another layer substantially nonporous to the electrolyte but porous to oxygen interposed between the metallic layer and the environment of the sensor. When oxygen is present in the environment the sensor has a current output related to the oxygen content.

Figure 1:
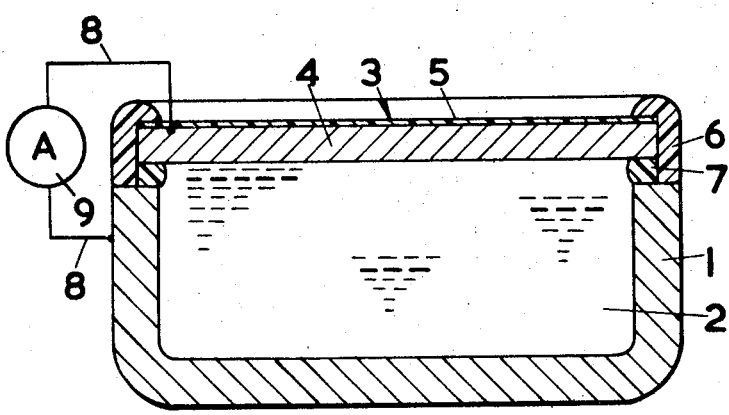

A particular embodiment is described in which the electrolyte is the eutectic of lithium, sodium and potassium nitrates and the gas diffusion electrode is a silver sinter/PTFE electrode.

The present invention is concerned with oxygen sensors which are capable of detecting oxygen when it is present in a mixture of gases or dissolved in a liquid and of measuring its concentration therein.

Oxygen sensors are known in which oxygen is electrochemically reduced at a cathode to produce a current which is proportional to the concentration of oxygen in the gas phase. However, such sensors generally have an aqueous electrolyte and are therefore incapable of operation at a temperature higher than about 100° C., although one device capable of operating above this temperature but having a solid electrolyte is known.

It is an object of the present invention to provide an oxygen sensor having an electrolyte which is liquid at its temperature of operation and which is capable of operating at temperatures in excess of about 100° C.

In accordance with the present invention an oxygen sensor includes an electrochemical cell having a gas diffusion electrode as cathode, a salt electrolyte capable of being molten at the temperature of operation of the sensor, and a counter electrode as anode; the gas diffusion electrode including a porous metal layer and another layer substantially non-porous to the electrolyte but porous to oxygen, interposed between the metallic layer and the environment of the sensor. This interposed layer is termed the gas-permeable layer and is conveniently non-conducting.

When oxygen is present in the environment adjacent the gas-permeable layer of the gas diffusion electrode, the cell has a current output which is proportional to the partial pressure of oxygen present and which may be measured and recorded by conventional means.

Preferably the counter electrode is a metal/metal oxide system wherein the metal is any metal stable in contact with the salt electrolyte melt and capable of forming an oxide substantially insoluble in said salt electrolyte when molten. Suitable metals include silver, tin, zinc, and indium and alloys thereof. Conveniently the metal counter electrode constitutes the container for the molten electrolyte, apart from the gas diffusion electrode by which gas in the environment of the sensor obtains access to the electrolyte.

Conveniently the counter electrode has its potential substantially unaltered by current flow and therefore acts as a reference electrode although in one embodiment of the present invention there is provided a reference electrode and means by which the gas diffusion electrode may be maintained at a constant potential with respect to said reference electrode. One reference electrode which may be used is the calomel electrode.

It has been found that when certain metals, for example zinc, are used as the counter electrode the original output of the sensor is not readily recovered after a period during which there has been no oxygen in the environment of the sensor. In the absence of oxygen no current flows and it is believed that under these circumstances the metal may react slightly with the electrolyte to form a substantially insoluble and highly protective oxide film which is not readily removed when the current starts to flow again.

In accordance with a further embodiment of this invention the difficulty may be overcome by including a subsidiary metal electrode in contact with the molten salt electrolyte but otherwise insulated from the counter electrode and the gas diffusion electrode and means for providing a continuous alternating current between the subsidiary electrode and the counter electrode.

Conveniently the subsidiary electrode constitutes part of the container for the molten electrolyte and is insulated from the remainder of the container by a suitable insulator for example PTFE.

The metal of the gas diffusion electrode may be any metal which is chemically stable in contact with the electrolyte and is advantageously silver or a noble metal, such as platinum or gold. The gas-permeable layer is preferably polytetrafluoroethylene (PTFE).

Suitable electrodes may be prepared by vacuum evaporation of the appropriate metal onto a film of PTFE broadly as described in copending U.K. application No. 46,675/66.

A preferred form of electrode may be obtained by the method described in co-pending U.K. application No. 49,243/69 which includes preparing a sinter of the appropriate metal and coating one surface of this with the gas-permeable layer. The coating may be achieved either by pressing the sinter against a thin sheet of suitable material, e.g. PTFE, and heating, or by spraying a dispersion of non-conductor particles of suitable material onto the surface of the metal sinter and heating to remove the dispersant and pressing to finally form the desired gas diffusion electrode. When the gas-permeable layer is to be of PTFE, the final pressing is advantageously for two minutes at 350° C. and a pressure of about 1 ton per square inch.

Another type of electrode which may be useful as a gas diffusion electrode in sensors of the present invention has been described by Niedrach and Alford in J. Electrochem. Soc. 112(2), 117 (1965).

The molten salt electrolyte is selected to be chemically stable and inert towards the metals of the electrodes at the temperature of operation. The electrolyte should also have a relatively low vapour pressure at that temperature and should be neither electrochemically reduced or oxidised at the potential taken up by the electrodes during operation of the device.

The electrolyte is in general not a pure salt but is a mixture and is conveniently the eutectic mixture of the particular components of the mixture. The eutectic has the advantage of having the lowest melting point obtainable with a particular set of salts, although it may be advantageous to use a single salt if the device is intended to operate at an elevated temperature, for example in excess of about 250° C. It has been found that mixtures of alkali metal salts are useful, and also that nitrates are useful, and in particular an electrolyte which is useful in an oxygen sensor for use at 150° C. is the eutectic of the sodium, potassium and lithium nitrates having the composition $NaNO_3$—30 mole percent; $KNO_3$—53.5 mole percent; $LiNO_3$—16.5 mole percent. The salt electrolyte may contain components other than salts, for example metal, particularly alkali metal, oxides and it may be advantageous to include in the salt electrolyte of the order of 0.01 M of an alkali metal oxide, sodium oxide is preferred.

Sensors of the present invention are capable of operation at temperatures in excess of about 100° C. The lower limit is determined by the melting point of the electrolyte, for example, with the sodium, potassium and lithium nitrate eutectic mentioned above this is 120° C. The upper limit is generally determined by the decomposition temperature of the gas-permeable material of the gas diffusion electrode. For PTFE this temperature is in the region of 300° C.

Although the sensors of the present invention are designed to operate in environments at elevated temperatures they can be operated in environments at normal temperatures by the provision of a heater capable of maintaining the salt electrolyte molten during operation.

In operation oxygen gas diffusing through the gas-permeable layer of the gas diffusion electrode is electrochemically reduced to give oxide ions which dissolve in the molten electrolyte. The counter electrode undergoes anodic dissolution to produce metal oxide and when the counter electrode is zinc, for example, the electrode reactions occurring are believed to be:

(1) At the gas-diffusion electrode $$O_2 + 4e = 2O^=$$

(2) At the zinc electrode $$2Zn = 2Zn^{++} + 4e$$

Hence the overall reaction is $$2Zn + O_2 = 2ZnO$$

When the rate of supply of oxygen to the cathode surface is rate-determining, the current becomes almost independent of the potential of the gas-diffusion electrode. The magnitude of the current is then directly proportional to the concentration of oxygen in the gas phase and may be detected and measured by conventional apparatus which forms no part of the present invention.

Figure 2:
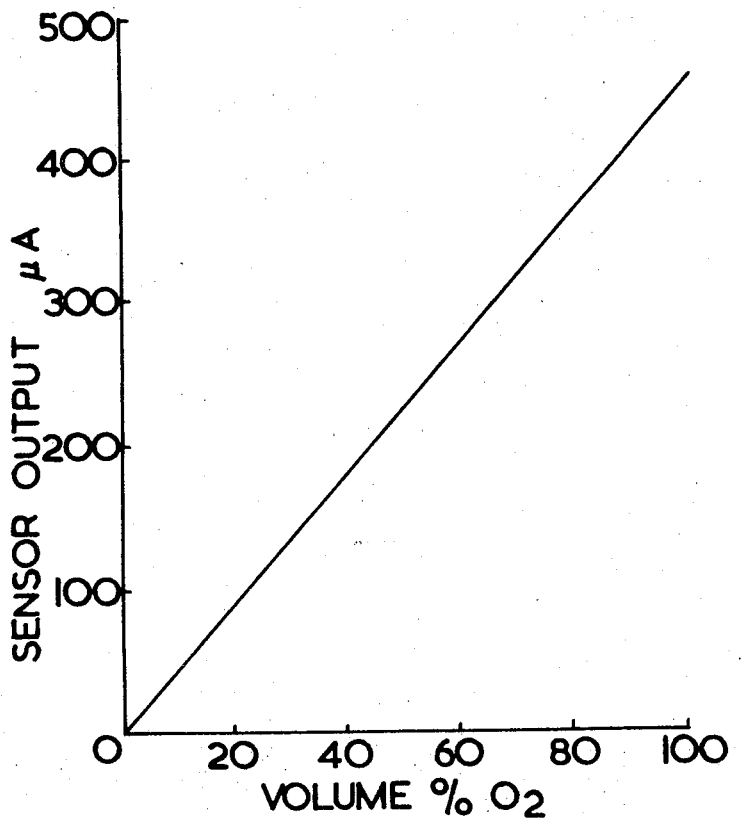
Figure 3:
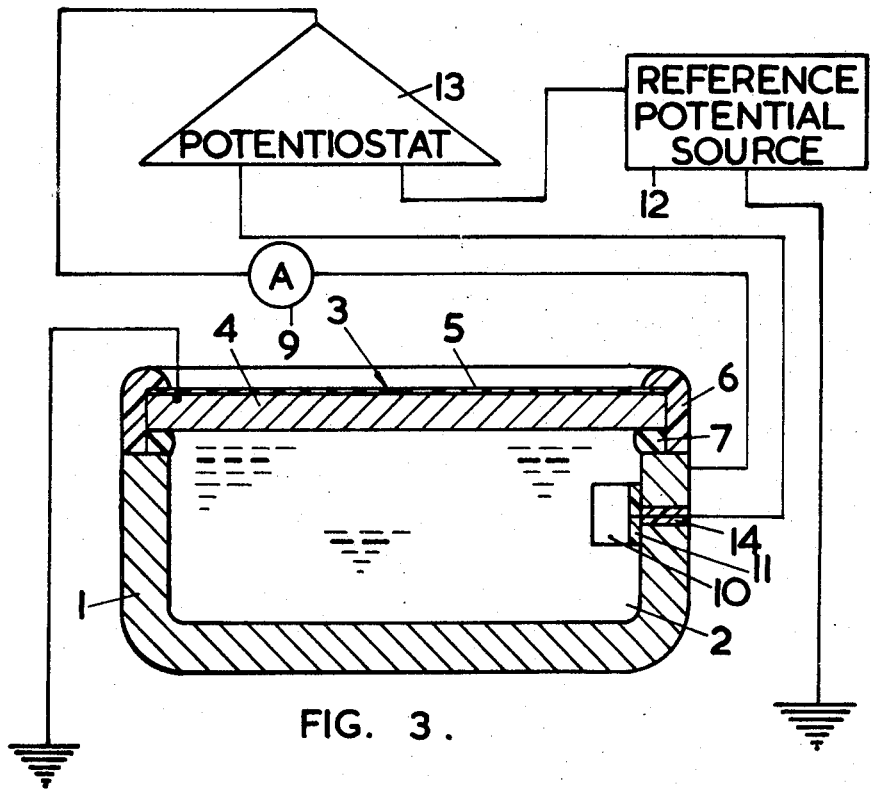
Figure 4:
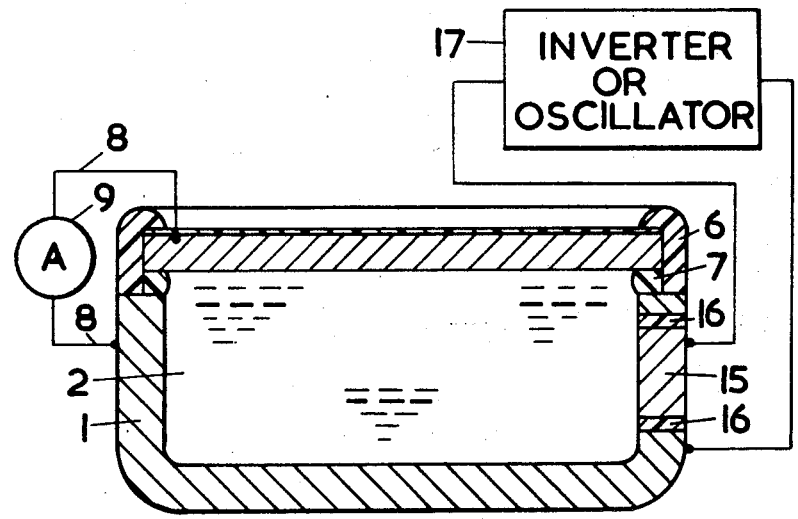

Three embodiments of the present invention will now be described by way of example only and with reference to the accompanying drawings, in which:

FIG. 1 is a schematic cross-sectional view of a sensor in accordance with the present invention, FIG. 2 is a graph of current output from the sensor against proportion of oxygen in the sample, FIG. 3 is a schematic cross sectional view of a sensor in accordance with the present invention and having a reference electrode, and FIG. 4 is a schematic cross-sectional view of a sensor in accordance with the present invention having a subsidiary electrode.

FIG. 1 is a schematic sectional drawing which shows a zinc container 1 containing a salt electrolyte 2 closed by a gas diffusion electrode 3 consisting of a silver-sinter cathode 4 in contact with the salt electrolyte 2 and a gas permeable polytetrafluoroethylene film 5. The gas diffusion electrode 3 is held in position and insulated from the zinc container by means of araldite 6 and an insulating polytetrafluoroethylene washer 7. The zinc container 1 is the anode of the sensor and which is connected by means of leads 8 with an ammeter 9 for the detection and recording of electrical currents. The ammeter may be calibrated in units of current or it may be calibrated in oxygen content of the environment sampled. The simple ammeter circuit illustrated here may be replaced by other circuits known to those in the art.

FIG. 2 is a straight line plot showing the relationship of current output (in microamps) to the proportion of oxygen in the gas sample (in volumes percent) for a sensor as described above having a circular gas diffusion electrode 3, one cm. in diameter. In this experiment the gas diffusion electrode consisted of a silver sinter cathode 4 of 0.04 inch thickness, and a gas permeable PTFE film 5 of 0.003 inch thickness. In this example the electrolyte was the sodium potassium and lithium nitrate eutectic consisting of $NaNO_3$—30 mole percent; $KNO_3$—53.5 mole percent; $LiNO_3$—16.5 mole percent. The measurements were taken with the sensor at 150° C.

One disadvantage of the above described sensor is that if the flow of current ceases, i.e. if at any time there is no oxygen present in the sampled gas then the sensor is slow to recover its original output on reintroduction of oxygen. This appears to be due to the zinc electrode reacting to a small extent with the molten electrolyte when on open circuit, becoming covered with a highly protective oxide film which is not readily removed when current starts to pass again on reintroduction of oxygen.

This difficulty may be overcome either by maintaining the potential of the gas diffusion electrode constant with respect to a reference electrode (illustrated schematically in FIG. 3) or by maintaining an alternating current between the counter electrode and a subsidiary electrode illustrated schematically in FIG. 4.

In FIGS. 3 and 4 like numerals depict the same parts as in FIG. 1.

FIG. 3 is a schematic sectional drawing which shows a zinc container 1 containing a salt electrolyte 2 closed by a gas diffusion electrode 3 consisting of a silver-sinter cathode 4 in contact with the salt electrolyte 2 and a gas permeable polytetrafluoroethylene film 5. The gas diffusion electrode 3 is held in position and insulated from the zinc container by means of araldite 6 and an insulating polytetrafluoroethylene washer 7. In this embodiment the gas diffusion electrode 4 is earthed, as illustrated, and a reference potential source 12 (of known design) also earthed provides one input to a potentiostat 13 (of known design). There is also in contact with the salt electrolyte 2 a reference electrode 10 insulated from the container 1 by an insulator 11 which provides a second input to the potentiostat 13 by way of an insulated plug 14 through the wall of the container 1. The output of the potentiostat 13 is connected to the container 1 through an ammeter 9, the reading on which is characteristic of the oxygen content of the sensor environment.

FIG. 4 is a schematic sectional drawing which shows a zinc container 1 containing a salt electrolyte 2 closed by a gas diffusion electrode 3 consisting of a silver-sinter cathode 4 in contact with the salt electrolyte 2 and a gas permeable polytetrafluoroethylene film 5. The gas diffusion electrode 3 is held in position and insulated from the zinc container by means of araldite 6 and an insulating polytetrafluoroethylene washer 7. A portion 15 of the container 1 is insulated from the remainder of the container 1 by means of an insulator 16 and an invertor or oscillator circuit 17 is provided by means of which an alternating current is maintained between the container 1 and the portion 15 insulated therefrom.

The cell described in the specific embodiments may be modified by substituting any metal not chemically attacked by the electrolyte for the zinc of the anode, for example, silver, copper, nickel, tin or indium or alloys thereof, for example, the indium—5% lead alloy. The cathode in the gas diffusion electrode may likewise be a noble metal such as platinum or gold.

We claim:

1. An oxygen sensor for operation at temperatures up to about 300° C. which includes
   an electrochemical cell having a gas diffusion electrode porous metal layer bound to a gas permeable, electrically non-conductive layer which is substantially impermeable to liquids, said gas permeable layer being interposed between the environment of the sensor and the metal layer;
a counter electrode as anode;
a molten salt electrolyte which is a mixture of nitrates, and wherein the counter electrode and the salt electrolyte are isolated from the environment other than through the gas diffusion electrode;
and measuring means to determine the current output of the electrochemical cell due to oxygen in the environment.

2. An oxygen sensor as claimed in claim 1 wherein the counter electrode is a metal/metal oxide system wherein the metal is a metal stable in contact with the salt electrolyte.

3. An oxygen sensor as claimed in claim 2 wherein the metal of the counter electrode is selected from the group consisting of zinc, indium, silver, tin and alloys thereof.

4. An oxygen sensor as claimed in claim 1 wherein the metal of the gas diffusion electrode is silver or a noble metal.

5. An oxygen sensor as claimed in claim 1 wherein the metal of the gas diffusion electrode is silver and the interposed layer is polytetrafluoroethylene.

6. An oxygen sensor as claimed in claim 5 wherein the metal of the gas diffusion electrode is a metal sinter.

7. An oxygen sensor as claimed in claim 1 wherein the salt electrolyte is an eutectic mixture of said nitrates.

8. An oxygen sensor as claimed in claim 1 wherein the salt electrolyte is a mixture of alkali metal nitrates.

9. An oxygen sensor as claimed in claim 1 wherein the salt electrolyte is the eutectic of sodium, potassium and lithium nitrates having a composition of 30 mole percent of sodium nitrate, 53.5 mole percent of potassium nitrate and 16.5 mole percent of lithium nitrate.

10. An oxygen sensor as claimed in claim 1 wherein the salt electrolyte includes about 0.01 M of an alkali metal oxide.

11. An oxygen sensor as claimed in claim 1 which includes heating means to maintain the salt electrolyte molten.

12. An oxygen sensor as claimed in claim 1 which also includes a reference electrode and means for maintaining the potential of the gas diffusion electrode constant with respect to said reference electrode.

13. An oxygen sensor as claimed in claim 1 which also includes a subsidiary electrode in contact with the salt electrolyte but otherwise insulated from direct contact with the counter electrode or the gas diffusion electrode and means for providing a continuous alternating current between said subsidiary electrode and said counter electrode.

14. An oxygen sensor for sampling the oxygen content of an environment at temperatures up to about 300° C. which includes an electrochemical cell having a gas diffusion electrode as cathode, said gas diffusion electrode consisting of a metal sinter wherein the metal is selected from the group consisting of silver and the noble metals, and an electrically non-conducting layer, which is substantially non-porous to the electrolyte but porous to oxygen, bound to said metal sinter and interposed between said metal sinter and the environment of the sensor,
a counter electrode as anode;
a molten salt electrolyte which is a mixture of alkali metal nitrates,
and wherein the counter electrode and the salt electrolyte are isolated from the environment other than through the gas diffusion electrode;
and measuring means to determine the current output of the electrochemical cell due to oxygen in the environment.

15. An oxygen sensor as claimed in claim 14 wherein the salt electrolyte is the eutectic of sodium, potassium and lithium nitrates having a composition of 30 mole percent of sodium nitrate, 53.5 mole percent of potassium nitrate and 16.5 mole percent of lithium nitrate.

16. An oxygen sensor as claimed in claim 14 wherein the metal of the gas diffusion electrode is silver, the non-conducting interposed layer is polytetrafluoroethylene and the counter electrode is zinc, or indium or an alloy thereof.

17. An oxygen sensor as claimed in claim 14 which includes heating means to maintain the salt electrolyte molten.

18. An oxygen sensor as claimed in claim 14 which also includes a reference electrode and means for maintaining the potential of the gas diffusion electrode constant with respect to said reference electrode.

19. An oxygen sensor as claimed in claim 14 which also includes a subsidiary electrode in contact with the salt electrolyte but otherwise insulated from direct contact with the counter electrode or the gas diffusion electrode and means for providing a continuous alternating current between said subsidiary electrode and said counter electrode.

References Cited
UNITED STATES PATENTS

| | | | |
|---|---|---|---|
| 2,384,463 | 9/1945 | Gunn et al. | 136—86 R |
| 2,980,749 | 4/1961 | Broers | 136—86 R |
| 3,196,100 | 7/1965 | Digby | 204—195 |
| 3,235,477 | 2/1966 | Keyser et al. | 204—195 |
| 3,276,909 | 10/1966 | Moos | 136—120 FC |
| 3,328,204 | 6/1967 | Grubb | 204—195 |
| 3,503,861 | 3/1970 | Volpe | 204—195 |
| 3,505,195 | 4/1970 | Nielsen et al. | 204—195 |
| 3,510,420 | 5/1970 | Mills | 204—195 |

TA-HSUNG TUNG, Primary Examiner

U.S. Cl. X.R.

204—1 T

UNITED STATES PATENT OFFICE
CERTIFICATE OF CORRECTION

Patent No. 3689394     Dated September 5, 1972

Inventor(s) David Frank DAVIES

It is certified that error appears in the above-identified patent and that said Letters Patent are hereby corrected as shown below:

A line of type has been omitted from Claim 1.
The following words should be inserted between "electrode" of line 75 of Col. 4 and "porous" of line 1 of Col. 5.

"as cathode, said gas diffusion electrode including a"...

Please also note that lines 28 to 31 of Col. 1 should constitute a part of the Abstract.

Signed and sealed this 20th day of February 1973.

(SEAL)
Attest:

EDWARD M. FLETCHER, JR.
Attesting Officer

ROBERT GOTTSCHALK
Commissioner of Patents